United States Patent
Lindholm

(10) Patent No.: US 12,362,892 B2
(45) Date of Patent: Jul. 15, 2025

(54) INTERFERENCE MITIGATION FOR SIDELINK TRANSMISSIONS IN SHARED CARRIER

(71) Applicant: Nokia Technologies Oy, Espoo (FI)

(72) Inventor: Jari Olavi Lindholm, Espoo (FI)

(73) Assignee: Nokia Technologies Oy, Espoo (FI)

( * ) Notice: Subject to any disclaimer, the term of this patent is extended or adjusted under 35 U.S.C. 154(b) by 474 days.

(21) Appl. No.: 17/934,841

(22) Filed: Sep. 23, 2022

(65) Prior Publication Data

US 2023/0103844 A1 Apr. 6, 2023

Related U.S. Application Data

(60) Provisional application No. 63/251,476, filed on Oct. 1, 2021.

(51) Int. Cl.
| | |
|---|---|
| *H04L 5/00* | (2006.01) |
| *H04W 52/24* | (2009.01) |
| *H04W 72/0446* | (2023.01) |
| *H04W 72/541* | (2023.01) |

(52) U.S. Cl.
CPC ......... *H04L 5/0092* (2013.01); *H04W 52/242* (2013.01); *H04W 72/0446* (2013.01); *H04W 72/541* (2023.01)

(58) Field of Classification Search
CPC ... H04L 5/0092; H04L 5/0044; H04L 5/0091; H04W 52/242; H04W 72/0446; H04W 72/541; H04W 72/40; H04W 92/18; H04W 72/23; H04W 52/383
See application file for complete search history.

(56) References Cited

U.S. PATENT DOCUMENTS

| | | | | |
|---|---|---|---|---|
| 2019/0349983 | A1* | 11/2019 | Loehr | H04W 72/23 |
| 2020/0154430 | A1* | 5/2020 | Gulati | H04L 5/0094 |
| 2020/0314770 | A1* | 10/2020 | Wu | H04W 52/281 |
| 2021/0168766 | A1* | 6/2021 | Su | H04W 72/20 |
| 2021/0250910 | A1* | 8/2021 | Park | H04L 5/0044 |
| 2021/0368466 | A1* | 11/2021 | Fakoorian | H04W 56/0015 |
| 2022/0110067 | A1* | 4/2022 | Ryu | H04L 5/0051 |
| 2022/0110142 | A1* | 4/2022 | Kwak | H04W 72/02 |
| 2023/0078557 | A1* | 3/2023 | Lee | H04W 52/246 370/318 |

OTHER PUBLICATIONS

"3rd Generation Partnership Project; Technical Specification Group Radio Access Network; NR; Physical channels and modulation (Release 16)", 3GPP TS 38.211, V16.6.0, Jun. 2021, pp. 1-134.

(Continued)

*Primary Examiner* — Rina C Pancholi
(74) *Attorney, Agent, or Firm* — Nokia Technologies Oy

(57) ABSTRACT

Systems, methods, apparatuses, and computer program products for sidelink transmission interference mitigation in shared carrier scenarios are provided. For example, a method can include receiving, at a user equipment, a configuration of sidelink communication from a network element. The method can also include communicating, by the user equipment, using the sidelink communication based on the received configuration. The configuration can be configured to mitigate interference between the sidelink communication and uplink communication.

18 Claims, 6 Drawing Sheets

(56) References Cited

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.
"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
"WID revision: NR sidelink enhancement", 3GPP TSG RAN Meeting #90e, RP-202846, Agenda: 9.8.3, LG Electronics, Dec. 7-11, 2020, 6 pages.

* cited by examiner

INTERFERENCE MITIGATION FOR SIDELINK TRANSMISSIONS IN SHARED CARRIER

CROSS-REFERENCE TO RELATED APPLICATION

This application claims the benefit of and is related as a non-provisional of Provisional Patent Application No. 63/251,476, filed Oct. 1, 2021, the entirety of which is hereby incorporated herein by reference.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing sidelink transmission interference mitigation in shared carrier scenarios.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. NR sidelink can adapt the core NR standard and may allow direct communication between two NR devices without going through a base station.

SUMMARY

An embodiment may be directed to an apparatus. The apparatus can include at least one processor and at least one memory comprising computer program code. The at least one memory and computer program code can be configured, with the at least one processor, to cause the apparatus at least to perform receiving a configuration of sidelink communication from a network element. The at least one memory and computer program code can also be configured, with the at least one processor, to cause the apparatus at least to perform communicating using the sidelink communication based on the received configuration. The configuration can be configured to mitigate interference between the sidelink communication and uplink communication.

An embodiment may be directed to an apparatus. The apparatus can include at least one processor and at least one memory comprising computer program code. The at least one memory and computer program code can be configured, with the at least one processor, to cause the apparatus at least to perform sending a configuration of sidelink communication to a user equipment. The at least one memory and computer program code can also be configured, with the at least one processor, to cause the apparatus at least to perform receiving uplink communication from another user equipment. The configuration can be configured to mitigate interference between the sidelink communication and the uplink communication.

An embodiment may be directed to a method. The method can include receiving, at a user equipment, a configuration of sidelink communication from a network element. The method can also include communicating, by the user equipment, using the sidelink communication based on the received configuration. The configuration can be configured to mitigate interference between the sidelink communication and uplink communication.

An embodiment may be directed to a method. The method can include sending, by a network element, a configuration of sidelink communication to a user equipment. The method can also include receiving, by the network element, uplink communication from another user equipment. The configuration can be configured to mitigate interference between the sidelink communication and the uplink communication.

An embodiment may be directed to an apparatus. The apparatus can include means for receiving a configuration of sidelink communication from a network element. The apparatus can further include means for communicating using the sidelink communication based on the received configuration. The configuration can be configured to mitigate interference between the sidelink communication and uplink communication.

An embodiment may be directed to an apparatus. The apparatus may include means for sending a configuration of sidelink communication to a user equipment. The apparatus may also include means for receiving uplink communication from another user equipment. The configuration may be configured to mitigate interference between the sidelink communication and the uplink communication.

BRIEF DESCRIPTION OF THE DRAWINGS

For proper understanding of example embodiments, reference should be made to the accompanying drawings, wherein.

DETAILED DESCRIPTION

Figure 1:
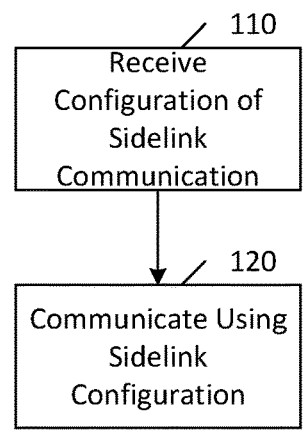
FIG. 1 illustrates an example flow diagram of a method, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing sidelink transmission interference mitigation in shared carrier scenarios, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may relate to sidelink enhancements regarding frequency bands on which sidelink communication may occur. For example, certain embodiments may help, with respect to sidelink frequency bands, to ensure coexistence between sidelink and Uu interface in the same and adjacent channels in licensed spectrum. More particularly, certain embodiments may handle the co-existence issue of sidelink (SL) and Uu interface, especially when they are in the same channel, which can be referred to as the so-called shared carrier case. The Uu interface can refer to any UE to radio access network air interface.

The sidelink transmissions can take place in the uplink resources of the Uu-interface when Uu and SL are in the same carrier. New radio (NR) sidelink transmissions can be synchronized to downlink (DL) timing when network timing is selected as the synchronization reference for SL transmissions. On the other hand, uplink (UL) transmissions in the same cell can use UL timing. Thus, UL transmissions in the UL resources can apply a timing advance obtained from the next generation Node B (gNB), but SL transmissions might not use timing advance. Thus, there is a potential for SL and UL to interfere with each other.

In consecutive slots, SL transmission in slot n can overlap UL transmission in slot n+1 because UL transmission may apply timing advance and may start earlier than SL transmission ends. In frequency domain, orthogonality between SL and UL subcarriers may not be maintainable when cyclic prefix is shorter than the timing difference between UL and SL.

DL timing, rather than UL timing, may be used for SL because the SL UEs may not necessarily be in the radio resource control (RRC) connected state and therefore may not have valid timing advance (TA) provided by the gNB.

Certain embodiments provide interference mitigation or isolation of sidelink (SL) and uplink (UL) transmission in time domain (for example, by shortening of the S-SS/PSBCH block), frequency domain (for example, by reserving unused subcarriers between SL and UL transmission) and power domain (for example, providing an improved SL power control method with a larger power difference measured at the gNB between SL and UL for UL UEs close to gNB and SL UEs close to cell edge, so that the same or overlapping time and frequency resources can be used simultaneously for SL and UL in certain configurations).

According to some embodiments, a configurable guard time may be supported. The configurable guard time may be defined in terms of empty symbols at the end of an SL slot. This kind of shortening of transmission can be used for slots containing physical sidelink shared channel (PSSCH) transmission, because the number of the PSSCH symbols may be configurable. On the other hand, sidelink synchronization signal block (S-SSB), which can also be referred to as sidelink synchronization signal/physical sidelink broadcast channel (S-SS/PSBCH) block, transmission may occupy all of the symbols except the last one in the slot. In certain embodiments, a structure can permit shortening of S-SS/PSBCH block, for example, by dividing S-SS/PSBCH block to two slots or reducing the number of symbols used for S-SS/PSBCH block transmission.

Alternatively, SL resource pool, for example the time and/or frequency resources configured for SL, may always be configured to include a slot next to S-SSB/PSBCH transmission.

The shortening (in time domain) of S-SSB (or S-SS/PSBCH) can be done in multiple ways. For example, S-SSB can be divided into consecutive slots, increasing the width of the S-SSB in frequency domain to compensate time-domain shortening, increasing the code-rate so that the payload can be transmitted with fewer resources, or dropping some of the reference signals of PSBCH. For example, every fourth subcarrier in PSBCH may be a demodulation reference signal (DM-RS) that may be dropped.

According to some embodiments, empty subcarriers between UL and SL can be reserved. For example, 6 subcarriers (½ resource block) below the SL resources and 6 subcarriers above the SL resources in frequency domain may not be used for SL but may be left empty.

In certain embodiments, the reservation can be to puncture (for example, leave blank) one or several subcarriers that are next to UL subcarriers and to use a lower code rate. In this way, SL transmission may be decoded at the receiver.

Reserving unused subcarriers between SL and UL can be done by network configuration so that UL transmissions are not scheduled to the resource blocks that are right above or right below (in frequency domain) the SL resource pool.

This may result in 12+12 subcarriers that are not used for any transmission. This may be considered too large a gap, considering typical Tx power levels, or power level differences, of UL and SL. Even the 6+6 unused subcarriers mentioned above may also be too much and supporting SL transmissions using allocations that are not multiple of 12 subcarriers could also be permitted. One option could be to blank (not transmit) those SL subcarriers that are next to UL subcarriers in frequency domain and compensate the blanking with a lower code rate.

According to certain embodiments, power control of the SL transmission can be enhanced. The current SL power for the case when interference to the gNB needs to be taken into account can follow Equation (1):

$$P_{PSSCH,D}(i) = P_{O,D} + 10 \log_{10}(2^{\mu} \cdot M_{RB}^{PSSCH}(i)) + \alpha_D \cdot PL_D$$
[dBm] Equation (1), where $P_{O,D}$ parameter can define the target power level at the gNB (for example, the power spectral density level) and PLD can be the pathloss between SL UE and gNB and $\alpha_D$ can be the so-called pathloss compensation factor. The subscript, D, can refer to parameter values used when pathloss in the power control equation is downlink pathloss measured at the UE using downlink reference signals. Subscript D may be needed with SL channels to indicate power level (PL) measurement in DL, from gNB to UE, because in SL, PL may also be measured between two UEs.

According to an embodiment, the value of $\alpha_D$ may be one. Thus, pathloss can be fully compensated and, at the gNB, the received power from different UEs can be the same. The value of $\alpha_D < 1$ can also be supported.

Values of $\alpha_D$ smaller than 1 may result in fractional pathloss compensation where UEs close to the target gNB can use higher relative power, because those UEs are farther away from neighboring gNBs that consider those transmissions as interference. In the sidelink case, $\alpha_D > 1$ may also be supported. For example, in some embodiments, $\alpha_D$ values larger than 1 can be used. Values larger than 1 may be used to enable resource reuse between sidelink and uplink in the shared carrier.

Regarding path-loss compensation in SL power control, the $\alpha_D$ value 1 may be useful in the case that UL and SL always use different resources. The configuration where the same resources are used for UL of UE in the vicinity of gNB, and for SL of UEs far away from gNB (but could still receive DL from gNB) may also be supported. In this case, an $\alpha_D$ value higher than 1 and suitable $P_{O,D}$ value could be used to enable reuse of the same resources. SL UEs close to gNB in a carrier shared with regular UE communicating with the gNB can be configured to mode 1 where network schedules SL transmissions and SL UEs that are outside of the network coverage (or only able to receive DL but not able to connect to gNB because of UL coverage problem) may have a separate resource pool and use mode 2 or autonomous scheduling of SL transmissions.

FIG. 1 illustrates an example flow diagram of a method for sidelink transmission interference mitigation in shared carrier scenarios, according to certain embodiments.

The method can include, at 110, receiving, at a user equipment, a configuration of sidelink communication from a network element. The method can also include, at 120, communicating, by the user equipment, using the sidelink communication based on the received configuration. The configuration can be configured to mitigate interference between the sidelink communication and uplink communication.

The configuration can include a reduction in S-SS/PSBCH block by reducing the number of symbols used for S-SS/PSBCH block. For example, the configuration can include a reduction of symbols of sidelink synchronization signal block or physical sidelink broadcast channel in a slot. As another option, the configuration can include dividing sidelink synchronization signal block or physical sidelink broadcast channel into two slots. For example, the configuration can include a reduction of symbols in a slot of S-SS/PSBCH block or just physical sidelink broadcast channel.

The configuration can include reserving a plurality of empty subcarriers between uplink and sidelink The reserving the plurality of empty subcarriers can include reserving half a resource block above the sidelink resources in frequency domain and half a resource block below the sidelink resources in frequency domain The configuration can include power control of the sidelink communication. The power control can take into account pathloss between the user equipment and the network element, for example using Equation (1) above. The configuration comprises a pathloss compensation factor, such as the $\alpha_D$ described above. A unity value of the pathloss compensation factor can be configured to cause transmissions from a plurality of user equipment including the user equipment to be received at a same power level at the network element (for example, a same power spectral density level). A pathloss compensation factor larger than one can be used to enable steeper power reduction of SL UEs when they come closer to gNB. Also, together with $\alpha_D > 1$, a suitable $P_{O,D}$ can be used.

The configuration can include configuration of a target power spectral density level. The target power spectral density level can define a power spectral density level to be received.

It is noted that FIG. 1 is provided as one example embodiment of a method or process. However, certain embodiments are not limited to this example, and further examples are possible as discussed elsewhere herein.

Figure 2:
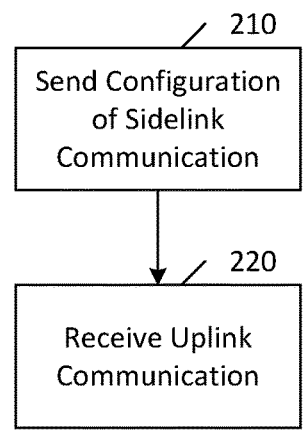
FIG. 2 illustrates an example flow diagram of a method, according to an embodiment.

FIG. 2 illustrates an example flow diagram of a method for sidelink transmission interference mitigation in shared carrier scenarios, according to certain embodiments. The approach of FIG. 2 may be usable alone or in combination with the approach of FIG. 1.

As shown in FIG. 2, a method can include, at 210, sending, by a network element, a configuration of sidelink communication to a user equipment. This may be received at 110 in FIG. 1.

As further shown in FIG. 2, the method can also include, at 220, receiving, by the network element, uplink communication from another user equipment. The configuration can be configured to mitigate interference between the sidelink communication and the uplink communication.

As described with reference to FIG. 1, the configuration in FIG. 2 can include a reduction in sidelink synchronization signal symbols block or physical sidelink broadcast channel symbols. As another option, the configuration can include dividing sidelink synchronization signal block or physical sidelink broadcast channel into two slots.

The configuration can include reserving a plurality of empty subcarriers between uplink and sidelink The reserving the plurality of empty subcarriers can include reserving half a resource block above the sidelink resources in frequency domain and half a resource block below the sidelink resources in frequency domain.

The configuration can include power control of the sidelink communication. The power control takes into account pathloss between the network element and the user equipment. The configuration can include a pathloss compensation factor. A unity value of the pathloss compensation factor can be configured to cause transmissions from a plurality of user equipment including the user equipment to be received at a same power level at the network element. A pathloss compensation factor $\alpha_D$ larger than one can be used to enable steeper power reduction of SL UEs when they come closer to the network element. Also, together with $\alpha_D > 1$, a suitable $P_{O,D}$ can be used.

It is noted that FIG. 2 is provided as one example embodiment of a method or process. However, certain embodiments are not limited to this example, and further examples are possible as discussed elsewhere herein.

Figure 3:
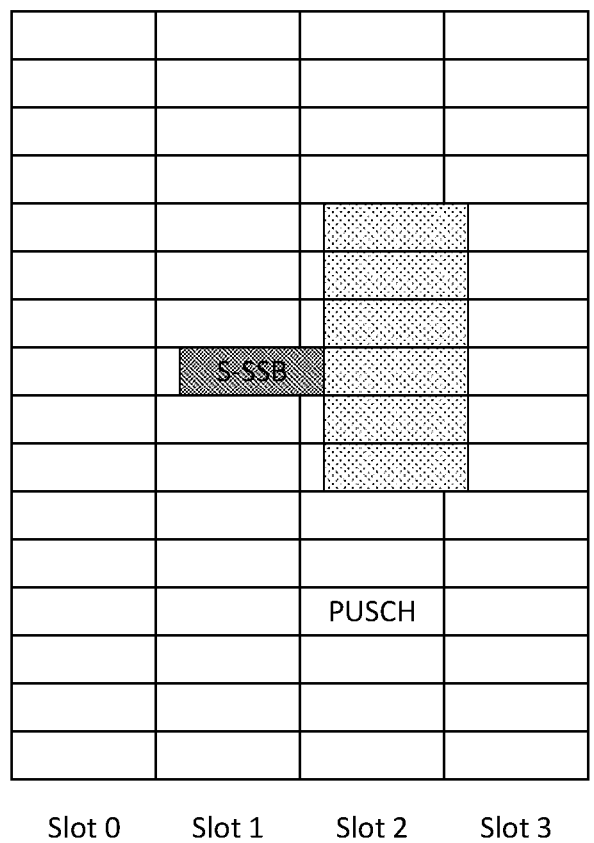
FIG. 3 illustrates an example where sidelink synchronization signal/physical sidelink broadcast channel block may be followed by resources belonging to a sidelink resource pool.

FIG. 3 illustrates an example where sidelink synchronization signal/physical sidelink broadcast channel block may be followed by resources belonging to a sidelink resource pool, according to certain embodiments. As shown in the legend, the light shaded boxes indicate a SL resource pool, a dark shaded box indicates S-SSB, while the white boxes show the resources used by uplink, such as physical uplink shared channel.

In the frequency domain, S-SSB may occupy 11 resource blocks so in the example of FIG. 3, one box can correspond to 11 resource blocks (RBs) in frequency domain Thus, FIG. 3 shows S-SSB followed by a slot belonging to a SL resource pool. The SL transmissions in the resource pool may take place slightly later than UL transmissions because, for example, timing advance may be used together with UL but not with SL transmissions. S-SSB may include only one guard symbol at the end of the slot.

The guard symbol may not be enough in cells where large timing advance values can occur. In certain embodiments, after the S-SSB there may be a slot belonging to an SL resource pool (slot 2 in this example). A longer guard period (more symbols reserved for guard period) can be thus configured for SL transmissions in this resource pool or carrier. The guard period configuration can be carrier specific, so all the resource pools may use the same guard period.

If a UE is scheduled to transmit PUSCH in slot 2 after S-SSB as presented in FIG. 3, the UE can drop the S-SSB and transmit only the PUSCH to avoid partly simultaneous transmission of PUSCH and S-SSB. Dropping may be acceptable, at least because S-SSB transmissions from different UEs in the same resources may be specified to be the same, so that the UE receiving the S-SSB can coherently use or combine S-SSBs from different UEs.

Figure 4:
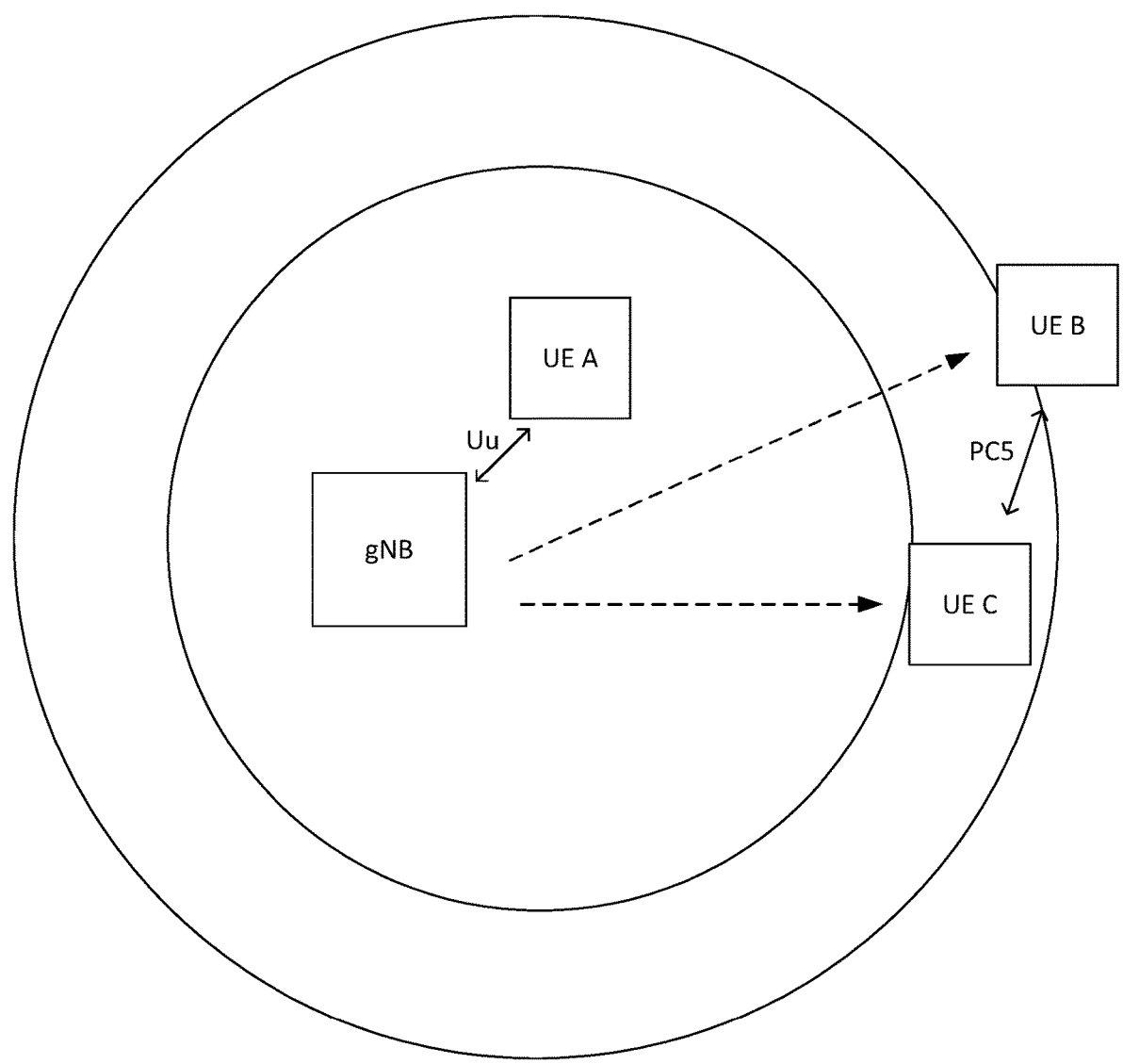
FIG. 4 illustrates sidelink and uplink resource reuse in a shared carrier.

FIG. 4 illustrates sidelink and uplink resource reuse in a shared carrier, according to certain embodiments. More particularly, FIG. 4 illustrates a scenario in which resource reuse between sidelink and uplink is possible. UEs within the outer circle can receive DL from gNB, which can include pathloss measurement resource pool configuration information. UEs within the inner circle, for example, UE A, may be in the coverage area of gNB, and their transmissions can be received at the gNB. The same resources can be configured for the Uu interface between gNB and UE A, and to PC5 interface between UE B and UE C. In this case a resource pool can be configured for SL UEs at the cell edge, for example in the area outside the inner circle but within the outer circle, in this case UE B and UE C. The same resources can be reused for Uu transmissions by the UEs close to gNB (for example, UE A), if power control parameters are properly adjusted. The idea of the SL power control in this case may be that if one of UE B or UE C moves inside the inner circle that UE's Tx power can decline, because Tx power depends on pathloss. If pathloss compensation factor, $\alpha_D$, is >1, power decline is steeper. Steep decline can guarantee that PC5/SL transmissions do not interfere Uu/UL transmission in the same resources. If SL UEs are close to gNB, resource reuse may not be able to be used, but another resource pool may be configured and Uu transmission may not take place in that resource pool. Multiple resource pools can be configured for a UE and resource pool specific power control parameters may be used.

SL UEs close to gNB in a carrier shared with regular UE communicating with the gNB may be configured to the so-called mode 1 where network schedules SL transmissions. In this case, the SL UEs that are outside of the network coverage or only able to receive DL but not able to connect to gNB because of an UL coverage limitation, may have a separate resource pool and use mode 2 or autonomous scheduling of SL transmissions.

Figure 5:
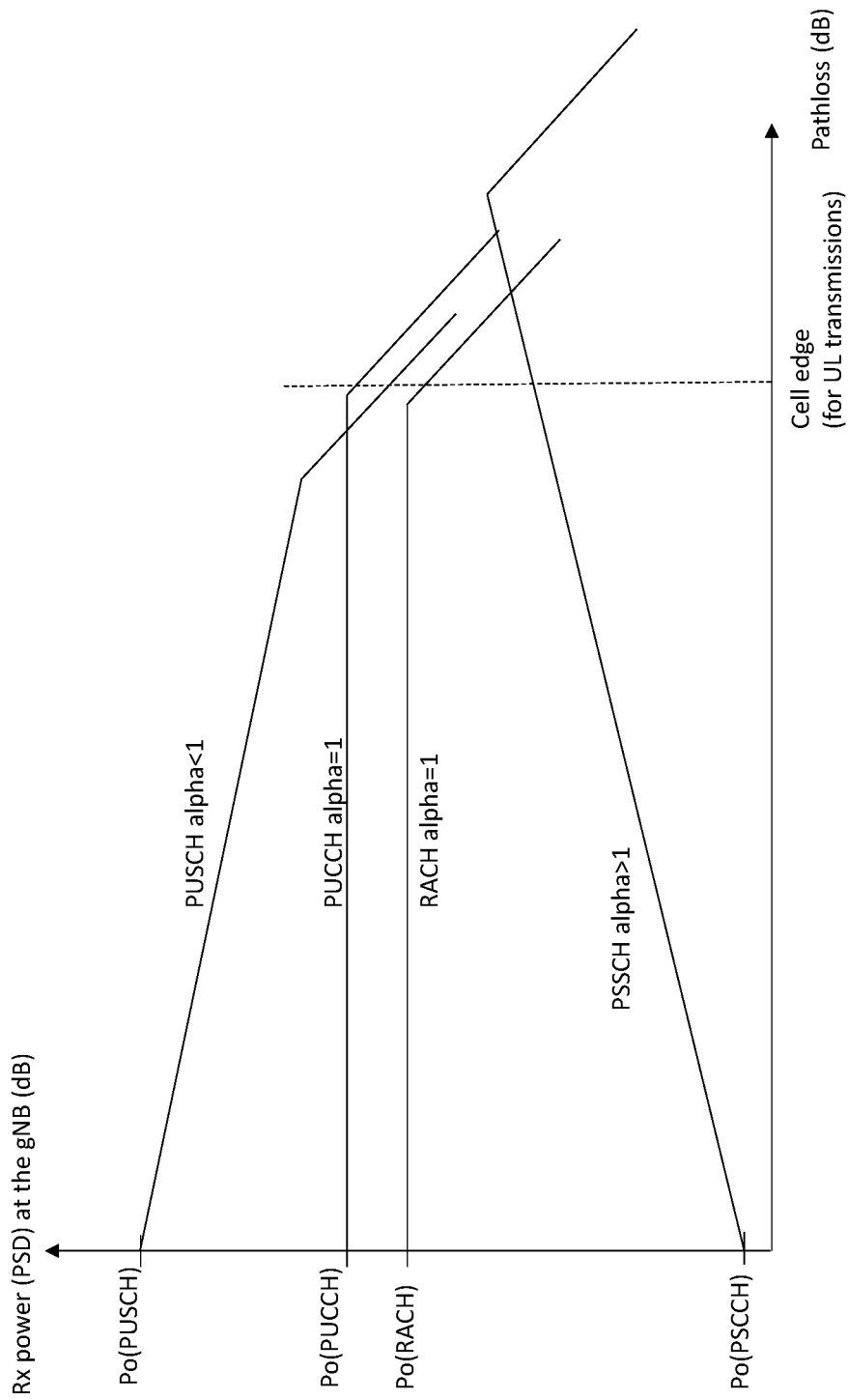
FIG. 5 illustrates received power spectral density (PSD) of sidelink and uplink channels, according to certain embodiments.

FIG. 5 illustrates received power spectral density (PSD) of sidelink and various uplink channels, according to certain embodiments. More particularly, FIG. 5 depicts received power spectral density of different UL channels and SL channel such as for example, PSSCH, with respect to pathloss. As shown in FIG. 5, the $\alpha_D$ parameter can define the slope of each line and the $P_O$ parameter can scale the power spectral density level. For PUCCH and RACH $\alpha_D = 1$ is used so that Rx power is the same for all UEs in this example. For PUSCH $\alpha_D < 1$ is used. Thus, UEs close to gNB (i.e., with a small pathloss) can use higher power to enable high peak data rates when the distance to neighbor cells is large and interference is not a problem. UL channels can reach their maximum transmission (Tx) power before cell edge. Beyond the cell edge, UEs may not be able to compensate pathloss increase anymore. For PSSCH, $\alpha_D > 1$ can be supported for, for example, the case when the same resources are used for UL of UE close to gNB and for SL of UE near the cell edge. If SL UE moves from cell edge towards gNB, the SL UE's Tx power can decrease quickly. This rapid decrease in power can guarantee that SL does not interfere UL transmissions in the same resources. Also, SL communications in this resource pool may become impossible for the UE due to low Tx power. Accordingly, the UE may need to find a different resource pool for SL transmissions.

Figure 6A:
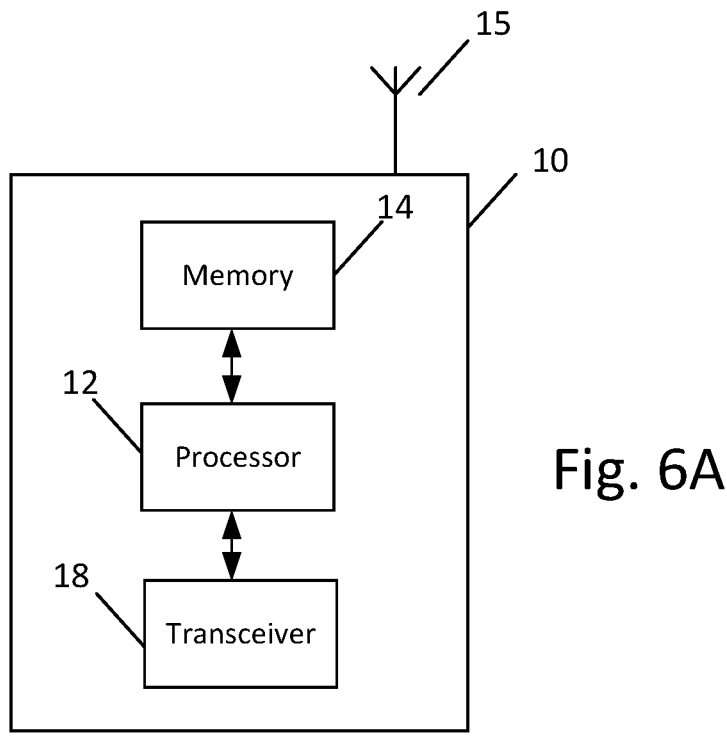
FIG. 6A illustrates an example block diagram of an apparatus, according to an embodiment.

FIG. 6A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing sidelink group coordination for group-specific synchronization reference, for example.

Figure 6B:
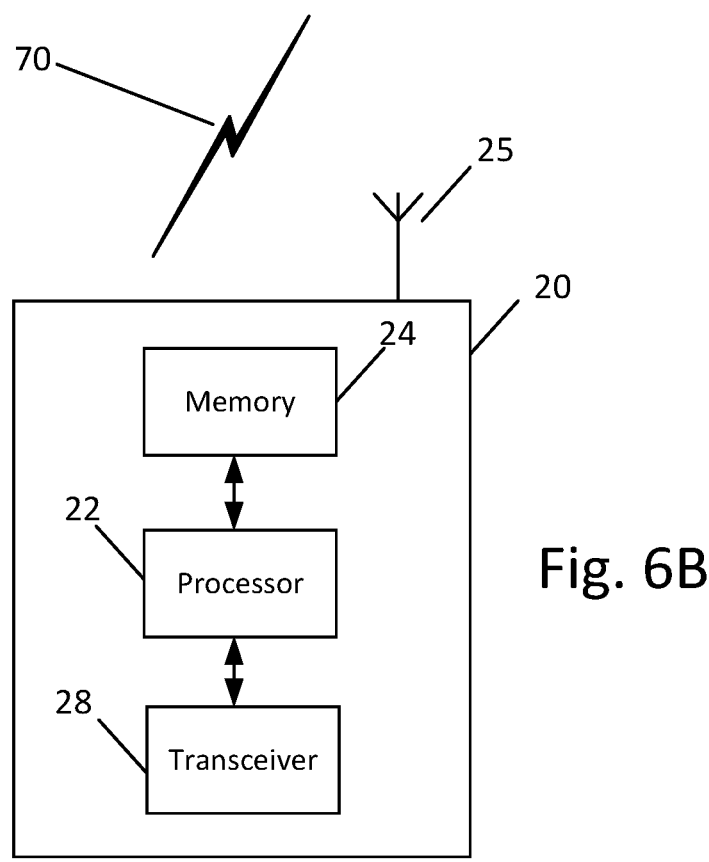
FIG. 6B illustrates an example block diagram of an apparatus, according to an embodiment.

FIG. 6B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing sidelink transmission interference mitigation in shared carrier scenarios, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, the mechanism of certain embodiments may permit transmitting in sidelink communication while avoiding unnecessary interference with uplink Moreover, certain embodiments may permit avoiding unnecessary reduction in sidelink communication, while avoiding interference with uplink communication.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

DL downlink
PSBCH physical sidelink broadcast channel
RACH random access channel
SL sidelink
S-SSB sidelink synchronization block
UL uplink
Uu air interface between UE and base station

I claim:
1. An apparatus, comprising:
at least one processor; and
at least one memory including computer program instructions,
wherein the at least one memory and the computer program instructions are configured to, with the at least one processor, cause the apparatus at least to perform:
receiving a configuration of sidelink communication from a network element; and
communicating using the sidelink communication based on the received configuration,
wherein the configuration is configured to mitigate interference between the sidelink communication and uplink communication, and the configuration comprises dividing sidelink synchronization signal block or physical sidelink broadcast channel into two slots.

2. The apparatus of claim 1, wherein the configuration comprises a reduction of symbols of sidelink synchronization signal block or physical sidelink broadcast channel in a slot.

3. The apparatus of claim 1, wherein the configuration comprises configuration of a sidelink resource pool including a slot immediately after a slot comprising sidelink synchronization signal/physical sidelink broadcast channel block.

4. The apparatus of claim 1, wherein the configuration comprises reserving a plurality of empty subcarriers between uplink and sidelink.

5. The apparatus of claim 4, wherein the reserving comprises blanking or puncturing sidelink subcarriers that are next to uplink subcarriers.

6. The apparatus of claim 4, wherein the reserving the plurality of empty subcarriers comprises reserving half a resource block above the sidelink resources in frequency domain and half a resource block below the sidelink resources in frequency domain.

7. The apparatus of claim 1, wherein the configuration comprises power control of the sidelink communication taking into account pathloss between the apparatus and the network element using a pathloss compensation factor, wherein the pathloss compensation factor is greater than one.

8. The apparatus of claim 1, wherein the configuration comprises configuration of a target power spectral density level, wherein the target power spectral density level defines a power spectral density level to be received at the network element from the apparatus.

9. An apparatus, comprising:
at least one processor; and
at least one memory including computer program instructions,
wherein the at least one memory and the computer program instructions are configured to, with the at least one processor, cause the apparatus at least to perform:
sending a configuration of sidelink communication to a user equipment; and
receiving uplink communication from another user equipment,
wherein the configuration is configured to mitigate interference between the sidelink communication and the uplink communication, and the configuration comprises dividing sidelink synchronization signal block or physical sidelink broadcast channel into two slots.

10. The apparatus of claim 9, wherein the configuration comprises a reduction of symbols of sidelink synchronization signal block or physical sidelink broadcast channel in a slot.

11. The apparatus of claim 9, wherein the configuration comprises configuration of a sidelink resource pool including a slot immediately after a slot comprising sidelink synchronization signal/physical sidelink broadcast channel block.

12. The apparatus of claim 9, wherein the configuration comprises reserving a plurality of empty subcarriers between uplink and sidelink.

13. The apparatus of claim 12, wherein the reserving comprises blanking or puncturing sidelink subcarriers that are next to uplink subcarriers.

14. The apparatus of claim 12, wherein the reserving the plurality of empty subcarriers comprises reserving half a resource block above the sidelink resources in frequency domain and half a resource block below the sidelink resources in frequency domain.

15. The apparatus of claim 9, wherein the configuration comprises power control of the sidelink communication taking into account pathloss between the user equipment and the apparatus using a pathloss compensation factor, wherein the pathloss compensation factor is greater than one.

16. The apparatus of claim 9, wherein the configuration comprises configuration of a target power spectral density level, wherein the target power spectral density level defines a power spectral density level to be received at the apparatus from the user equipment.

17. A method, comprising:
receiving, at a user equipment, a configuration of sidelink communication from a network element; and
communicating, by the user equipment, using the sidelink communication based on the received configuration,
wherein the configuration is configured to mitigate interference between the sidelink communication and uplink communication, and the configuration comprises dividing sidelink synchronization signal block or physical sidelink broadcast channel into two slots.

18. The method of claim 17, wherein the configuration comprises a reduction of symbols of sidelink synchronization signal block or physical sidelink broadcast channel in a slot.

* * * * *